(12) United States Patent
Zuber et al.

(10) Patent No.: US 7,239,658 B1
(45) Date of Patent: Jul. 3, 2007

(54) COHERENT DEMODULATION OF HOPPED MSK WAVEFORMS SYSTEM AND METHOD

(75) Inventors: Eric O. Zuber, South Amana, IA (US);
Terry J. Golubiewski, Marengo, IA (US)

(73) Assignee: Rockwell Collins, Inc., Ceder Rapids, IA (US)

( * ) Notice: Subject to any disclaimer, the term of this patent is extended or adjusted under 35 U.S.C. 154(b) by 819 days.

(21) Appl. No.: 10/437,564

(22) Filed: May 14, 2003

(51) Int. Cl.
*H04B 1/69* (2006.01)

(52) U.S. Cl. .................................. 375/136

(58) Field of Classification Search ............... 375/136, 375/130, 147, 150, 145, 316
See application file for complete search history.

(56) References Cited

U.S. PATENT DOCUMENTS

| 5,659,574 A | 8/1997 | Durrant et al. | 375/206 |
| 5,953,370 A | 9/1999 | Durrant et al. | 375/208 |
| 2002/0196860 A1* | 12/2002 | Ohtaki | 375/260 |

* cited by examiner

*Primary Examiner*—Khai Tran
(74) *Attorney, Agent, or Firm*—Nathan O. Jensen; Kyle Eppele

(57) ABSTRACT

A method of demodulating a frequency hopped waveform is disclosed. The method comprises receiving an analog radio frequency signal, converting the analog signal to a digital pulse signal, and determining the I and Q bits in the digital pulse signal. The method also comprises derotating the Q bits by a ninety (90) degree phase shift. The method further comprises deriving an approximate phase angle for the pulse from the I and derotated Q bits.

20 Claims, 6 Drawing Sheets

COHERENT DEMODULATION OF HOPPED MSK WAVEFORMS SYSTEM AND METHOD

BACKGROUND

Spread spectrum radio frequency systems are a variety of signal modulation that spreads a signal to be transmitted over a bandwidth that substantially exceeds the data-transfer rate. In direct sequence spread spectrum, a data signal is modulated with a pseudo-random chip sequence. The encoded spread spectrum signal is transmitted to the receiver. The receiver receives the signal and de-spreads the signal. Many techniques are available for transmitters to modulate the data signal, including but not limited to minimum shift keying (MSK).

Conventionally, in de-spreading a spread spectrum signal, a receiver produces a correlation pulse in response to the received spread spectrum signal. When the received spread spectrum signal matches the chip sequence to a predetermined degree, correlation is achieved. Conventionally, a variety of techniques exists for correlating a received signal with a chip sequence, including surface acoustic wave (SAW) correlators, tapped delay line (TDL) correlators, serial correlators, and the like.

A problem which may be encountered in attempting to correlate spread spectrum signals transmitted using MSK techniques, may be the absence of a coherent reference signal in the receiver. A coherent reference signal may be defined as a locally generated signal that matches the transmitter carrier signal in frequency and phase. The receiver may use the locally generated reference signal to demodulate the received signal. In practice, however, it may be difficult to independently generate a local reference signal in the receiver which precisely matches the transmitted carrier signal in frequency and phase. A local reference signal generated in the receiver is often a non-coherent signal which may have differences in frequency and phase from the transmitter's carrier signal. The frequency and phase differences are not constant but vary over time. During an attempt to demodulate a received signal using a non-coherent reference signal, errors in correlation may occur due to mismatches in timing and variations in perceived amplitude caused by the frequency in phase differences.

Various methods for dealing with the above problem exist in which a coherent reference signal is created in the receiver by continuously measuring the frequency and phase differences between the received signal and a locally generated non-coherent reference signal, and then adjusting the non-coherent reference signal until it matches the frequency and phase of the received signal. Such methods, however, generally require the use of a relatively complex feedback technique and require successive amounts of hardware. Further, locking on to the received frequency and phase can take an unacceptably large amount of time, particularly in systems where time is of the essence, such as in certain time division multiple access (TDMA) systems in which only a relatively brief time slot is allocated for periodic communication between a transmitter and receiver.

Non-coherent digital matched filters have been described which use four real filter channels to perform four-phase quantization in the complex plane, with the four quadrants being the quantization regions, and the result taken on the four complex values of $\pm 1 \pm j$. In such systems using a four-phase filter, an input signal may be divided into an in-phase signal (I) and a quadrature signal (Q). The in-phase signal and the quadrature signal are separately filtered, sampled and digitized using one-bit quantization. The quantized in-phase signal and the quantized quadrature signal are each fed into two binary correlators each programmed with a reference sequence of N chips, one chip for each sample. The outputs of the four binary correlators are combined to produce a resultant output signal. The described four-phase filter is a system using only one-bit quantization, and is not a technique that may be used for serial correlation.

Hopped MSK waveforms such as Link-16 use two stages to sample and demodulate data. The first step is to detect a synchronization preamble that is used to recover accurate chip timing information. The input sample stream can then be decimated to 1 sample per chip and data is demodulated. Coherent demodulation of the data requires embedding some number of known value chips to act as a phase reference for the rest of the data within the pulse. The remaining chips are then compared to the sum of the phase reference bits to determine whether they are a 1 or a 0.

Accordingly, there is a need for a method of modulation and demodulation particularly suited to MSK signals. Further, there is a need for a system and method of MSK modulation and demodulation that does not require the generation of a coherent reference signal, and that is capable of rapid correlation, and that may be used with analog correlators and digital correlators in an effective manner.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One example of the invention relates to a method of demodulating a frequency hopped waveform. The method comprises receiving an analog radio frequency signal, converting the analog signal to a digital pulse signal, and determining the I and Q bits in the digital pulse signal. The method also comprises derotating the Q bits by a ninety (90) degree phase shift. The method further comprises deriving an approximate phase angle for the pulse from the I and derotated Q bits.

Another example of the invention relates to an apparatus for demodulating a frequency hopped waveform. The apparatus comprises a means for receiving an analog radio frequency signal, a means for converting the analog signal to a digital pulse signal, and a means for determining reference bits in the digital pulse signal. The apparatus also comprises a means for shifting a portion of the reference bits by a minus ninety (90) degree phase shift. The apparatus further comprises a means for deriving an approximate phase angle for the pulse from the unshifted and shifted reference bits.

Yet another example of the invention relates to a radio frequency receiver. The radio frequency receiver comprises an antenna coupled to radio frequency circuitry for receiving radio frequency signals. The radio frequency receiver also comprises a processing device associated with a memory, the processing device coupled to the radio frequency circuitry and a program stored in the memory and running on the processor, the program deriving the phase angle of a signal pulse using a group of received reference bits and a least squares fitting algorithm and the program determining the direction of a one bit and a zero bit along the phase angle based on the reference bits.

Alternative examples and other exemplary embodiments relate to other features and combination of features as may be generally recited in the claims.

BRIEF DESCRIPTION OF THE DRAWINGS

The invention will become more fully understood from the following detailed description, taken conjunction with the accompanying drawings, wherein like reference numerals refer to like elements, in which.

DETAILED DESCRIPTION OF PREFERRED AND EXEMPLARY EMBODIMENTS

Figure 1:
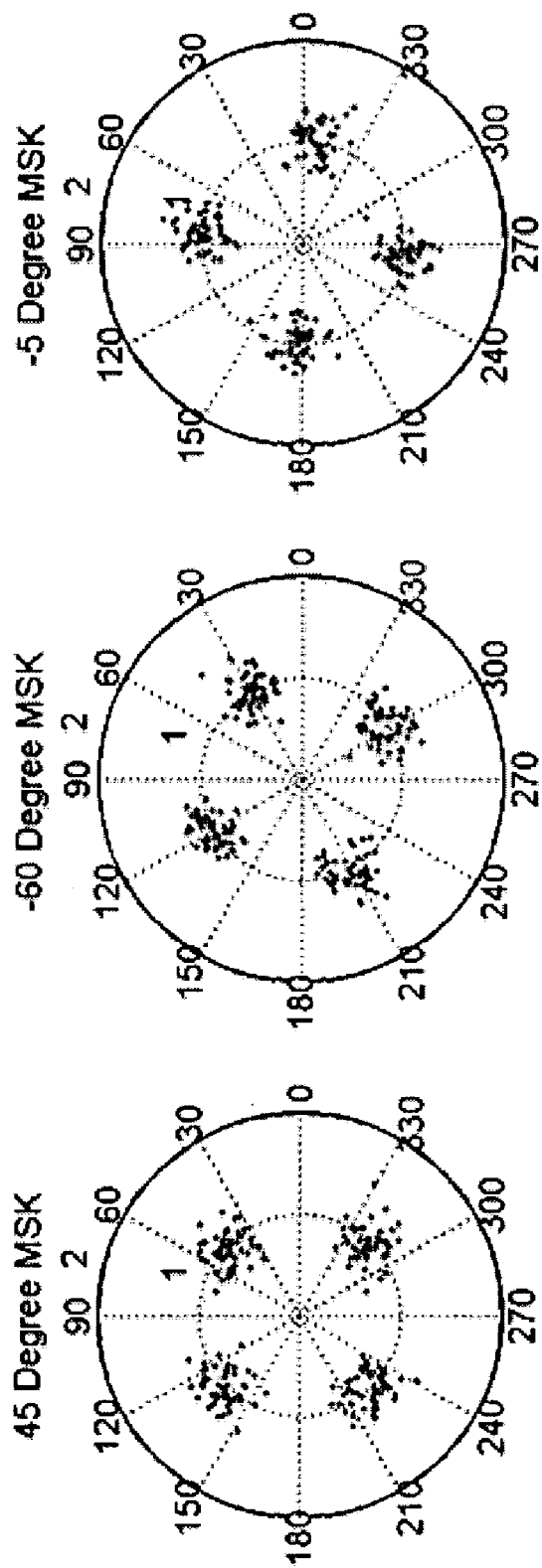
FIG. 1 is an exemplary plot of a one sample per chip data stream per three pulses of a hopped MSK waveform.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a plot of a one (1) sample per chip data stream for three (3) pulses of a hopped MSK waveform is depicted. Data from each pulse is received at some arbitrary phase offset; 45, −60 and −5 degrees were chosen at random for the exemplary figure. The data shown is received at an unrealistically high signal-to-noise ratio (SNR) to aid in illustrating the alignment process.

Figure 2:
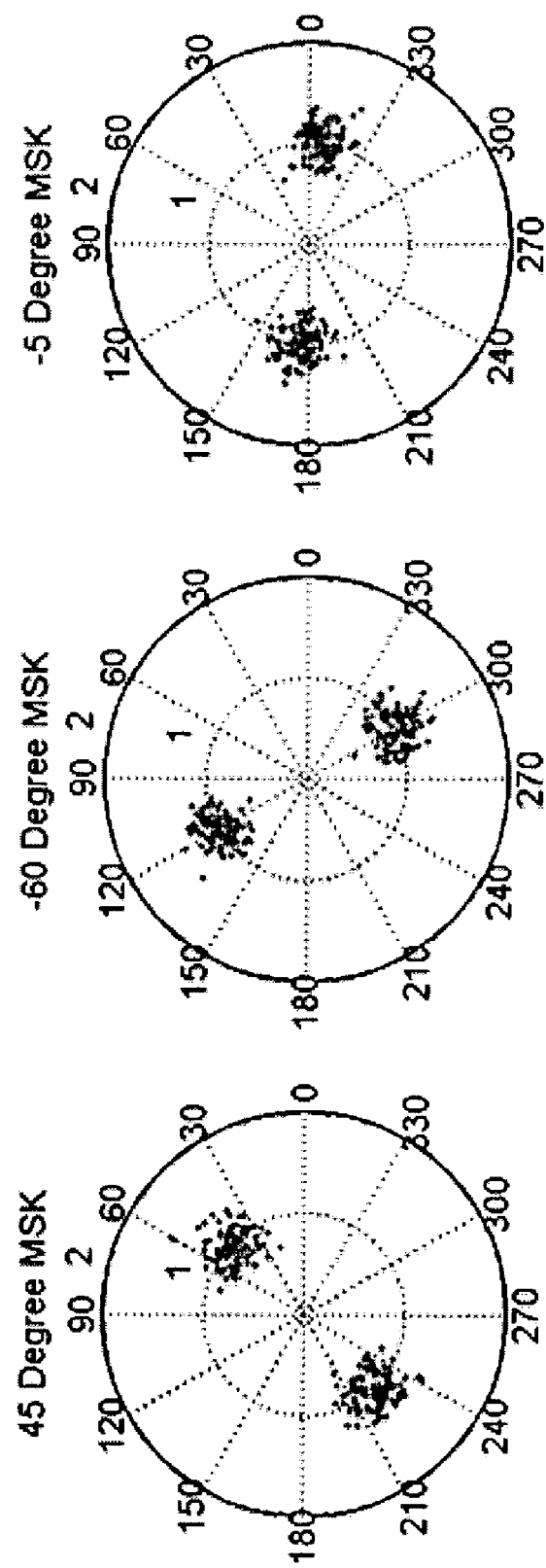
FIG. 2 is an exemplary depiction of the 90 degree derotated MSK chips of FIG. 1.

Because the waveform was time-aligned prior to taking each sample by detection of the synchronization preamble, it is known which sample is I and which is Q. Because there is always a ±π/2 radians (±90 degree) rotation between adjacent MSK chips, rotating the Q samples by −π/2 radians (−90 degrees) will orient them in the I direction as depicted in FIG. 2.

Figure 3:
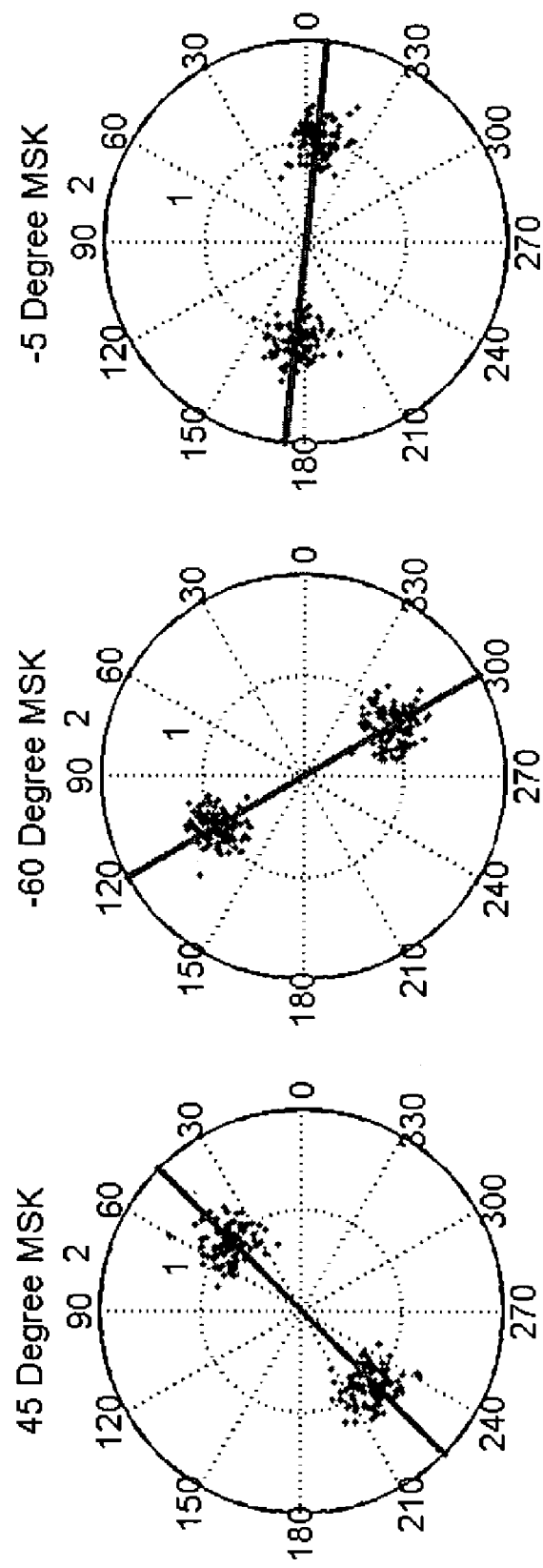
FIG. 3 is an exemplary depiction of the axis orientation of derotated MSK data depicted in FIG. 2.

To determine the axis along which the bits can be determined, the least-squares best fit line through the points and the origin can be calculated using the following equation:

$$\Theta = \frac{\pi}{2} - \frac{\mathrm{atan2}\left[\frac{2\cdot\sum I\cdot Q}{\sum Q^2 - \sum I^2}\right]}{2}$$

where I is the Re{sample}, Q is Im{sample} and Θ is the angle of the best-fit line passing through the origin. Alternatively, other forms of the equation and other best-fit algorithms may be used without departing from the scope of the invention. Performing this operation on the data from FIG. 2 yields the results shown in FIG. 3, that is, the phase angle of the I axis with the line through the origin. The equation above has been transformed into a form which may be implemented in hardware for high speed waveforms using an integer divider circuit for the division and a cordic resolver to calculate the arc-tangent. Other hardware configurations may also be used and/or derived without departing from the scope of the invention.

The line shown above is the I axis of the data chips for the pulse. Now the phase reference bits embedded within the data can be used to determine the positive direction along the I axis and coherent bit determinations can be made.

This method of axis determination is believed to be superior to using only the phase reference chips to determine IQ axis orientation since it uses all of the available energy within the pulse to align the axis rather than only the fraction carried in the phase reference chips. This improved orientation of the axis will therefore yield improved bit error performance.

Figure 4:
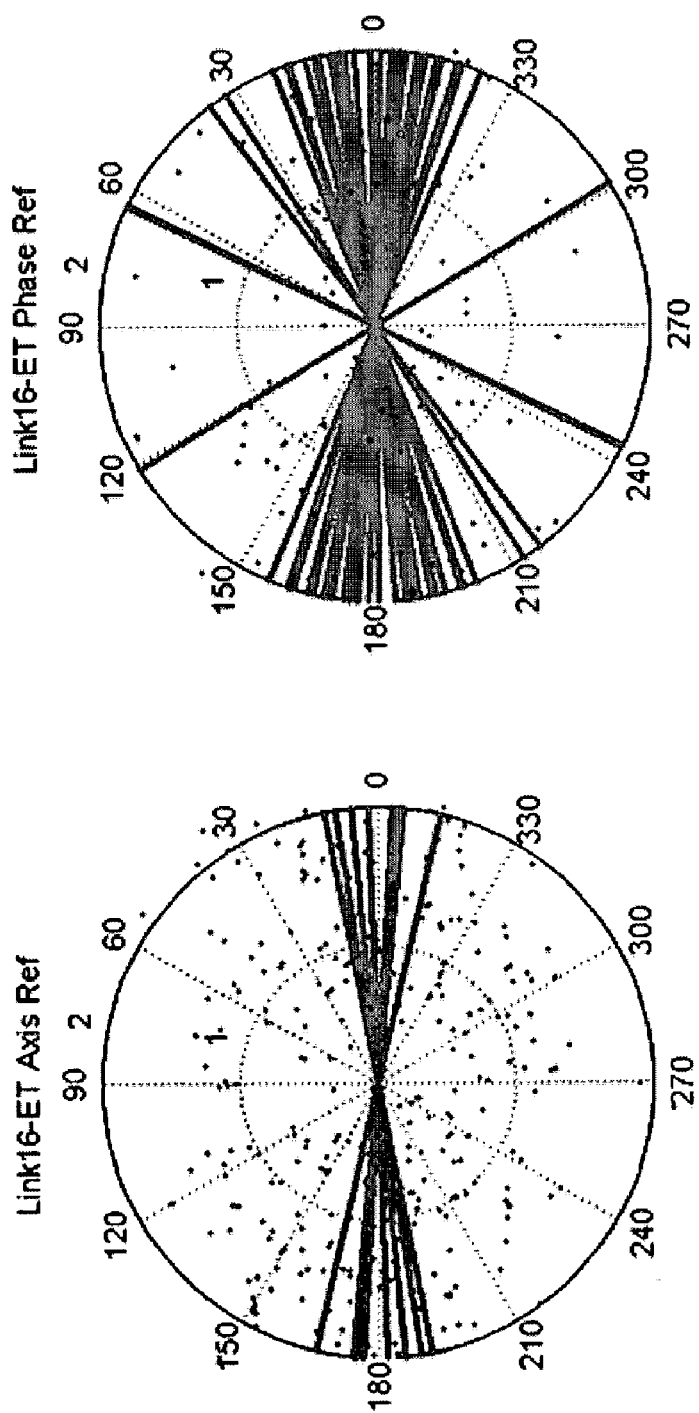
FIG. 4 is an exemplary depiction of the results of the use of the inventive axis determining system compared with the conventional phase referenced method.

The benefits of the process described above can be more clearly seen at lower SNR values for a Link-16 Enhanced Throughput (ET) waveform as depicted in FIG. 4. This waveform uses 32 chip pulses with 4 phase reference chips per pulse. The performance of the improved method vs. the simple phase reference only method is shown here at a 0 dB SNR for a number of pulses. The data in this case was received at a 0° variation while the 'Phase Reference' method shows about a +25° variation with several excursions out to ±60°.

This technique may also be used to estimate doppler offset of a pulse by calculating the Θ for the front part of the pulse and subtract the Θ for the back part. Further, the technique may be applied to other spread spectrum systems, especially, but not limited to those with MSK.

Figure 5:
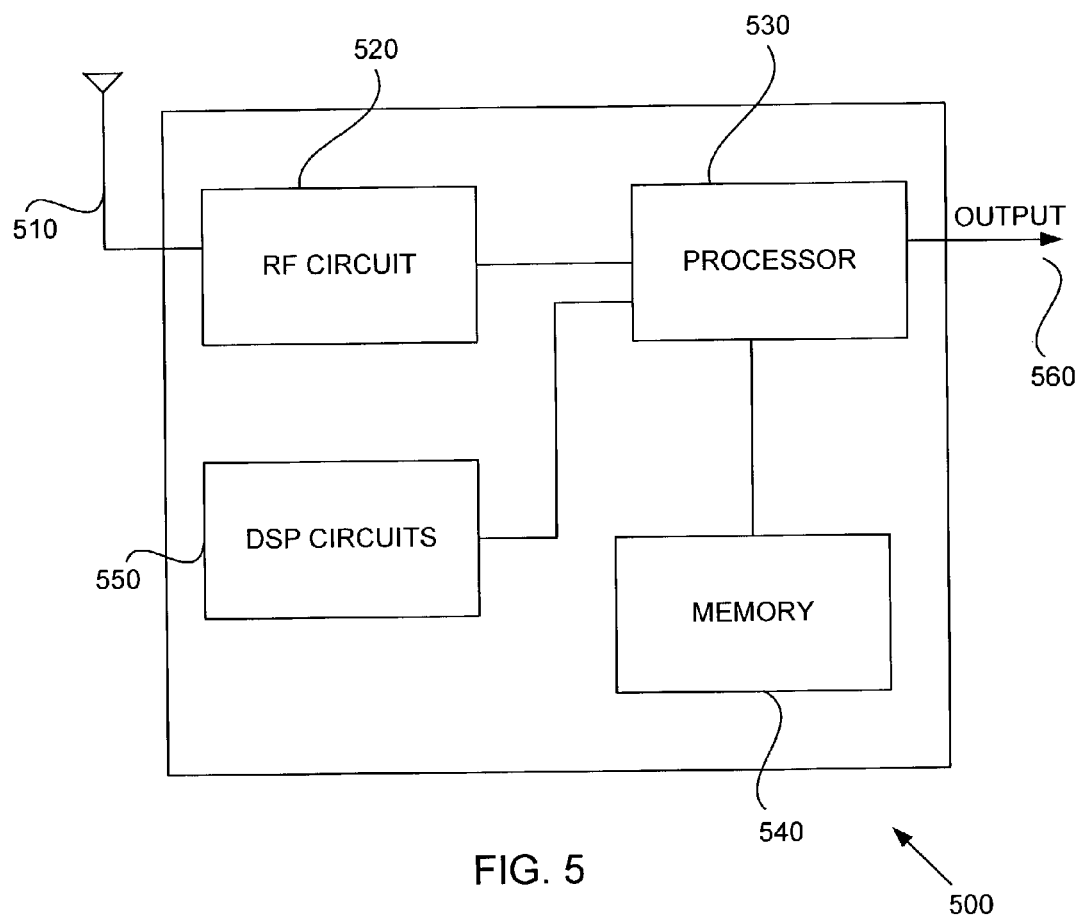
FIG. 5 is an exemplary block diagram of a radio frequency receiving apparatus in which the inventive method may be embodied.

Referring now to FIG. 5, a block diagram 500 of a radio frequency receiver 500 in which the invention may be employed, is depicted. Radio frequency receiver 500 includes an antenna 510 for receiving the radio frequency signals. Antenna 510 is coupled to front end radio frequency circuitry 520 which is configured to convert the analog signal to a digital signal form. Radio frequency circuitry 520 is coupled to a processor 530. Processor 530 is associated with a memory 540 and with digital signal processing circuitry 550. A program may be run in the processor which carries out the steps of the process as described above the generate estimates of the I axis of the data chips for a particular pulse. Further, DSP circuitry 550 may be used to demodulate the pulse once the I axis has been determined and an output 560 may be provided. The block diagram of FIG. 5 is generally representative of a receiver system, but the invention is not limited to a receiver system configured in the form shown. Accordingly, the invention may be applied in any of a variety of receiver configurations and/or transceiver configurations.

Figure 6:
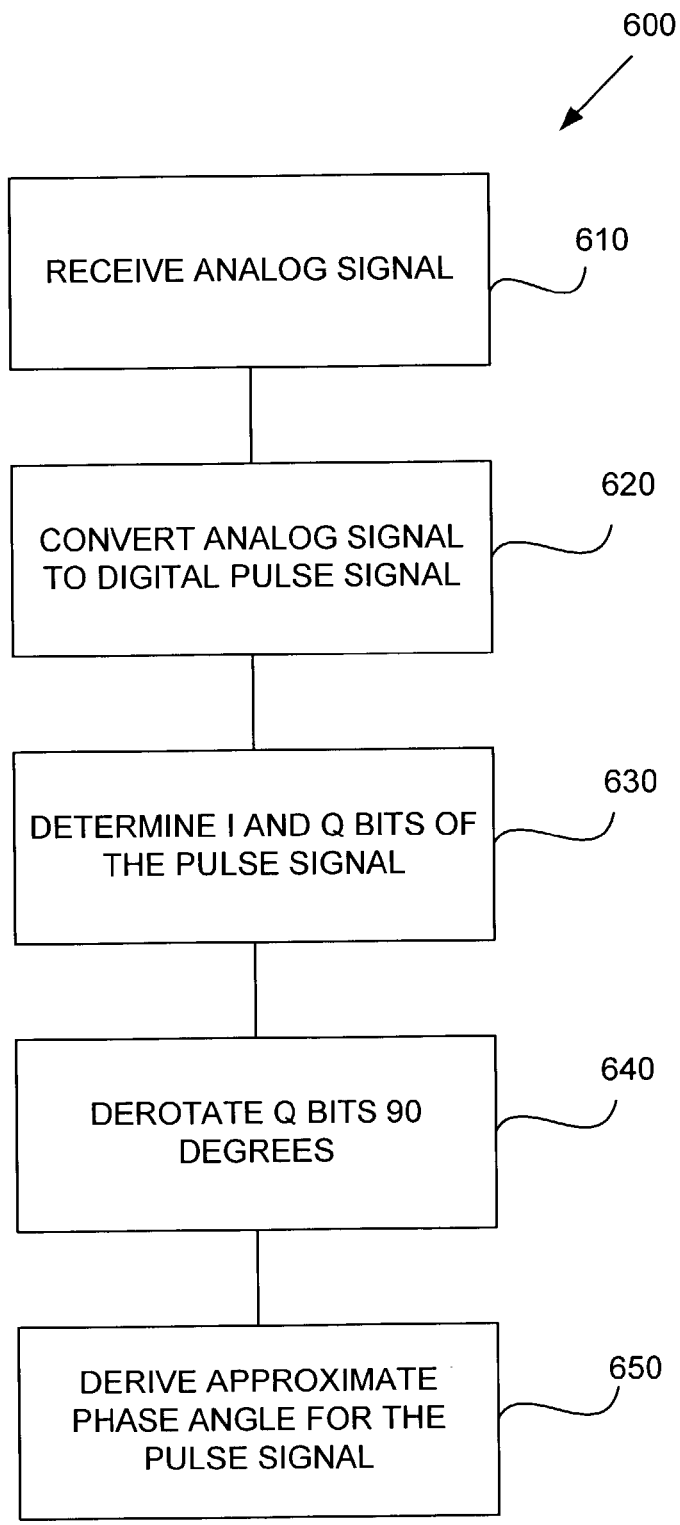
FIG. 6 is an exemplary process diagram depicting an exemplary set of steps of the demodulation method.

Referring now to FIG. 6, an exemplary process 600 is depicted. Process 600 includes exemplary steps for processing spread spectrum signals in accordance with the invention. An analog signal is received by a radio frequency receiver (step 610). Once the analog signal is received, it is converted to a digital pulse signal (step 620). The imaginary and real bits of the pulse signal are then determined (step 630). The Q bits are derotated by 90 degrees (step 640), and an approximate phase angle for the I signal is then derived (step 650). Process 600 is an example of the steps which may be used in accordance with the invention, however the invention is not limited to the steps shown and described, but may be carried out with alternative step orders and with additional or fewer steps.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the communication devices. For example, the type of processor, digital signal processing chip, etc. used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of demodulating a frequency hopped waveform, comprising:
   receiving an analog radio frequency signal;
   converting the analog signal to a digital pulse signal;
   determining the I and Q bits in the digital pulse signal;
   derotating the Q bits by a ninety (90) degree phase shift; and
   deriving an approximate phase angle for the digital pulse signal from the I and derotated Q bits.

2. The method of claim 1, further comprising:
   using a plurality of phase reference bits embedded within the digital pulse signal to determine the direction of a one bit and a zero bit along the phase angle.

3. The method of claim 2, further comprising:
   identifying a plurality of data bits within the digital pulse signal.

4. The method of claim 3, further comprising:
   processing the data bits within the digital pulse signal according to the determined direction of the one bit and the zero bit.

5. The method of claim 4, further comprising:
   processing the data bits within the digital pulse signal according to the derived phase angle.

6. The method of claim 1, wherein the deriving is performed using a least squares fit algorithm.

7. The method of claim 1, wherein the method is applied to a Link-16 waveform.

8. The method of claim 1, wherein the digital pulse has a thirty-two (32) bit word length.

9. An apparatus for demodulating a frequency hopped waveform, comprising:
   a means for receiving an analog radio frequency signal;
   a means for converting the analog signal to a digital pulse signal;
   a means for determining quadrature bits in the digital pulse signal;
   a means for shifting a portion of the quadrature bits by a minus ninety (90) degree phase shift; and
   a means for deriving an approximate phase angle for the digital pulse signal from the unshifted and shifted bits of the digital pulse signal.

10. The apparatus of claim 9, further comprising:
    a means for determining from a plurality of phase reference bits received embedded within the digital pulse signal, the direction of a one bit and a zero bit along the phase angle.

11. The apparatus of claim 10, further comprising:
    a means for identifying a plurality of I and Q data bits within the digital pulse signal.

12. The apparatus of claim 11, further comprising:
    a means for processing the I and Q data bits according to the determined direction of the one bit and the zero bit.

13. The apparatus of claim 12, further comprising:
    a means for processing the I and Q data bits according to the derived phase angle.

14. A radio frequency receiver, comprising:
    an antenna coupled to a radio frequency circuitry for receiving radio frequency signals;
    a processing device associated with a memory, the processing device coupled to the radio frequency circuitry;
    a program stored in the memory and running on the processing device, the program deriving a phase angle of a signal pulse using a group of received phase reference bits and a plurality of I and Q bits and a least squares fitting algorithm and the program determining the direction of a one bit and a zero bit along the phase angled based on the phase reference bits.

15. The radio frequency receiver of claim 14, wherein the radio frequency signals are Link-16 waveforms.

16. The radio frequency receiver of claim 14, wherein the radio frequency signals are frequency hopped minimum shift keying signals.

17. The radio frequency receiver of claim 14, wherein the signal pulse has a thirty-two (32) bit word length.

18. The radio frequency receiver of claim 14, wherein the phase reference bits include a I and Q bits.

19. The radio frequency receiver of claim 14, wherein the least fitting algorithm is derived for implementation in hardware.

20. The radio frequency receiver of claim 19, wherein the hardware includes a cordic resolver circuit.

* * * * *